United States Patent [19]
Pelland

[11] Patent Number: 6,053,230
[45] Date of Patent: Apr. 25, 2000

[54] ROTARY HOT AIR WELDER

[75] Inventor: Ray Pelland, Sagle, Id.

[73] Assignee: Pelland Automation, Inc., Sandpoint, Id.

[21] Appl. No.: 08/957,287

[22] Filed: Oct. 24, 1997

[51] Int. Cl.$^7$ .................................................. B32B 35/00
[52] U.S. Cl. .......................... 156/359; 156/361; 156/367; 156/378; 156/497; 156/499; 156/555
[58] Field of Search .................................... 156/359, 361, 156/366, 367, 378, 497, 499, 555

[56] References Cited

U.S. PATENT DOCUMENTS

| | | | |
|---|---|---|---|
| 3,530,027 | 9/1970 | Nuckols, Jr. . | |
| 3,775,222 | 11/1973 | Aspin et al. | 156/497 |
| 3,804,697 | 4/1974 | Jacobi | 156/582 |
| 3,951,050 | 4/1976 | Poole | 156/497 X |
| 3,962,016 | 6/1976 | Alfter et al. | 156/304 |
| 4,070,222 | 1/1978 | Olson | 156/497 |
| 4,447,288 | 5/1984 | Seaman | 156/574 |
| 4,608,114 | 8/1986 | Nakao | 156/497 |
| 4,655,870 | 4/1987 | Mori et al. | 156/285 |
| 4,769,102 | 9/1988 | Neumuller et al. | 156/359 |
| 4,834,827 | 5/1989 | Obeda | 156/555 X |
| 4,855,004 | 8/1989 | Chitjian | 156/359 |
| 4,872,941 | 10/1989 | Lippman et al. | 156/497 |
| 4,909,870 | 3/1990 | Gould et al. | 156/66 |
| 4,950,352 | 8/1990 | Greller | 156/497 |
| 5,466,326 | 11/1995 | Cherney | 156/359 |
| 5,616,199 | 4/1997 | Jurrius et al. | 156/64 |
| 5,816,019 | 10/1998 | Saget et al. | 156/499 X |

*Primary Examiner*—Curtis Mayes
*Attorney, Agent, or Firm*—Ostrager Chong Flaherty & Onofrio, P.C.

[57] ABSTRACT

The present invention provides a hot air welding apparatus that provides accurate and repeatable control of the drive wheel speed. To afford very precise control of the speed and relative rotation of the drive wheels at all times during the welding process, the present invention is provided with a computer control system and two high torque stepper motors, one for each drive wheel. The computer control system allows the speed and position of the drive wheels to be regulated with a very high accuracy. The computer control system allows the drive wheel settings to be adjusted while the seam is being welded and further includes an automatic ramp capability, a repeat mode, and a test strip mode. Further, the computer control system is capable of controlling the temperature of the air used in the welding process.

19 Claims, 5 Drawing Sheets

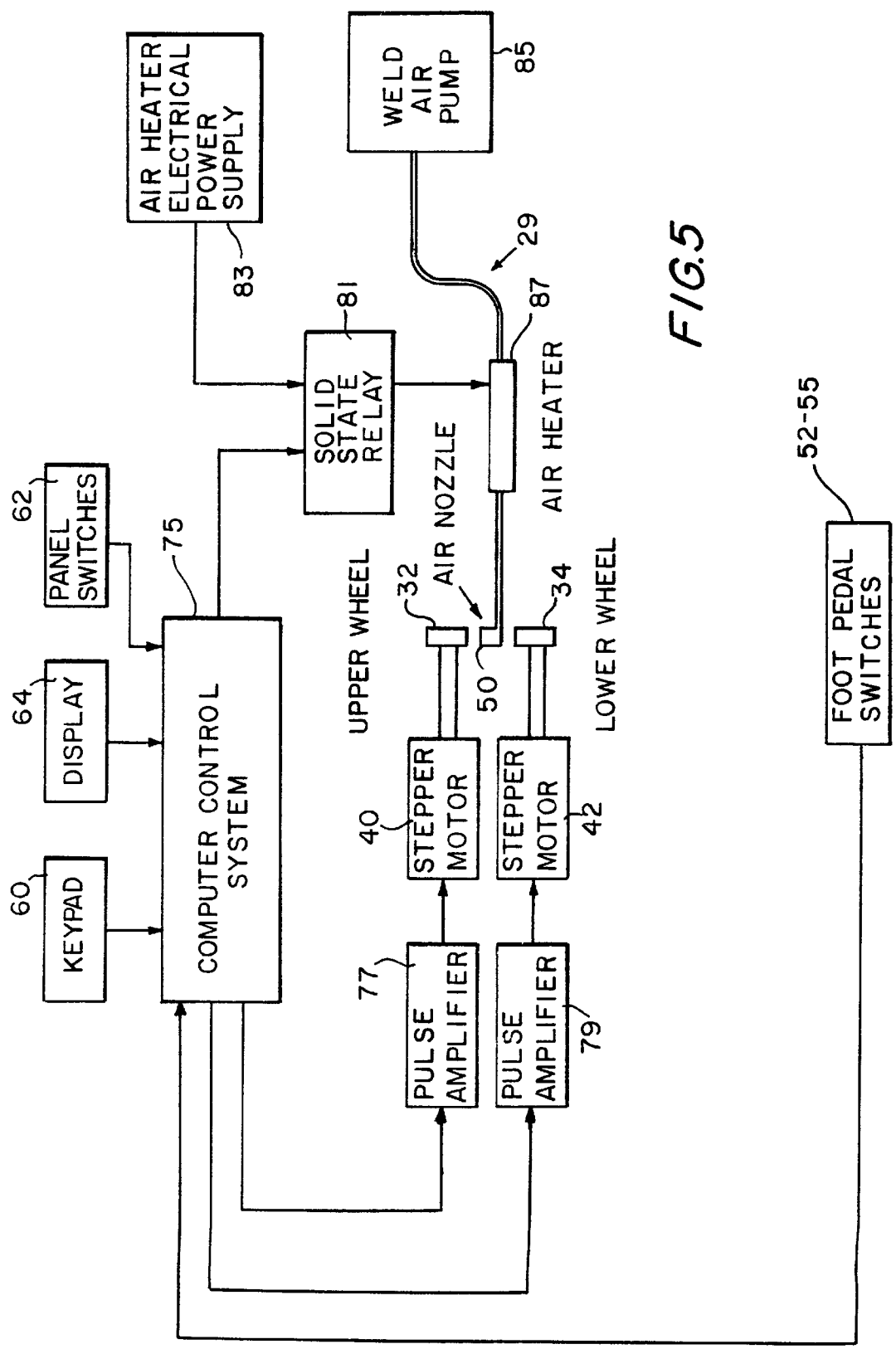

ROTARY HOT AIR WELDER

BACKGROUND OF THE INVENTION

This invention relates generally to apparatuses for welding industrial textiles and, more particularly, to an apparatus for welding pieces of industrial textiles such as thermoplastic materials or thermoplastic coated fabrics together.

The industrial textile industry is based on the availability of a variety of thermoplastic extruded sheeting and thermoplastic coated fabrics. These materials are used to make a wide range of products such as, for example, inflatable boats, hot air balloons, covers for outdoor structures, geomembranes for lining toxic waste sites, awnings and tents, outdoor banners, artistic fabric sculptures, liquid transportation containers, dry bags, and waterproof storage sacks. The products are generally lightweight, can be folded to a small size when not in use, have coatings that are generally impervious to industrial chemicals, and can be purchased in a wide range of colors, textures and fabric weights. Such fabrics generally come in approximately 5 to 12 foot wide rolls and thus must be cut into the required pattern pieces before being joined together to make the completed product.

There are three basic methods by which pieces of coated fabric can be joined together to create a mechanical bond as well as watertight and gas tight seams: traditional sewing followed by applying waterproof tape to the seam, gluing, and heat sealing (also called welding). Fabrics coated with certain rubber based coatings, such as Hypalon (manufactured by DuPont) can only be glued or sewn. Most of the newer coatings including polyurethane, polyvinylchloride, polypropylene, and polyethylene can either be glued or welded. However, gluing can be very labor intensive and further is subject to strict scrutiny from the Occupational Safety and Health Administration ("OSHA") due to the volatile solvents that are employed during the gluing operation. Most gluing now takes place in countries other than the United States.

There are four main methods of heat sealing or welding in use: hot wedge, radio frequency ("RF"), ultrasonic, and hot air. In the hot wedge method, two fabric pieces are drawn across a hot iron (or wedge) and then are pressed together. This method is quite similar to the hot air process with only the heat delivery system being different. One disadvantage of this method is that the wedge can become contaminated with dirt and melted plastic which then reduces the amount of heat delivered to the seam. Further, hot wedge welders typically experience a hot section immediately after the beginning of the weld as the wedge accumulates excess heat when idle. Another disadvantage is that, since the heat energy must pass through a solid object to reach the seam, the maximum speed of the hot wedge welding process is limited by the thermal conductivity of the wedge.

The RF method is probably the most widely used approach for heat sealing. The RF welder is basically an antenna (the die) that is poorly matched to the amplifier, thereby producing a great deal of heat rather than radio waves between the antenna and the underlying plate. In practice, the two fabric pieces are laid on the plate. The die is then brought down, thereby pressing the two pieces together. The operator then initiates the welding process by pressing a pair of push buttons. The actual RF process takes from about 5 to 15 seconds, depending upon the thickness of the pattern pieces and the amount of RF energy available from the machine.

There are, however, several disadvantages to the RF method. RF welding is a slow process because the size of the die is limited by the available energy of the unit. Typical RF welding dies are about 1 to 3 feet in length and approximately ½ inch wide. There is also some concern about the operator's health and safety as the operator is usually inches from an intense RF source which may be activated several hundred times in a typical shift. While RF health hazards have not been documented, it is known that stray RF energy from such machines can damage electrical equipment within approximately 50 feet of the machine and can light fluorescent fixtures located nearby. In addition, due to the die and plate arrangement, the RF method is typically limited to seams or joints that can be laid flat for welding. Three dimensional dies and plates are occasionally used, but are quite expensive and require a vacuum or other methods to hold the fabric in position as the die is applied. Further, the Federal Communications Commission ("FCC") has become increasingly strict regarding emissions of stray RF energy from industrial sources. Because of the increasingly strict FCC regulations, new RF welding equipment can typically cost $80,000 or more.

Ultrasonic welding is a process that is like RF welding, with the exception of the energy source. Rather than using radio waves, ultrasonic welding uses sound waves that basically vibrate the fabric molecules until sufficient heat is generated to melt the coatings.

In general, hot air welding is much faster than other methods, can accommodate three dimensional patterns, and requires no dies or tooling. In a hot air welder, the flow of hot air that floods the seam is not subject to contamination, as with the wedge welder, and there is no initial drop off of heat at the beginning of the seam. Most fabricators want the speed of hot air technology, but have felt that it is difficult to obtain consistent results for many types of coated fabrics and also that it requires highly trained operators.

The typical rotary hot air welding apparatus uses hot air to join together two pieces of plastic coated fabric. The welder first injects a stream of hot air from a hot air nozzle between the two pieces of coated fabric. The temperature of the hot air can be set in the range of approximately 500 to 1350 degrees F. The fabric pieces are then pinched between and pulled through the apparatus by two drive wheels. The distance from the hot air nozzle and the pinch point between the two wheels is in the range of approximately 0.5 to 0.75 inch. The wheel speed determines how long the fabric is exposed to the hot air stream before it passes between the wheels. With a constant air temperature, the amount of heat energy delivered to the fabric is inversely proportional to the wheel speed; a faster speed decreases the exposure and vice versa.

Commercial hot air welders currently available on the market have a number of shortcomings. One shortcoming is the lack of accurate control of the speed of the two drive wheels. If the wheel speed varies from the required speed, then the amount of heat delivered to the seam will vary. Too much heat supplied to the weld results in burnt fabric while too little heat results in cold welds or unwelded fabric.

The problem of providing accurate wheel speed is compounded by the need to control both wheels independently. For some fabric patterns, especially patterns with curves, one wheel may need to run slightly slower or faster than the other wheel. Commercial hot air welders typically use a single DC motor with a variable speed (voltage) amplifier. The drive energy from the motor passes through a long series of chains and pulleys to the bottom drive wheel. The drive energy to the top drive wheel first passes through a variable diameter pulley transmission that provides adjustment for the relative wheel speed and then passes through a similar set of chains and pulleys.

This arrangement is fairly inaccurate and is not easily or consistently repeatable. With any particular speed setting, the actual wheel speed can vary with both the temperature of the amplifier and the motor windings and with the load on the motor. This is typical of a DC drive system in which there is no feedback to the motor.

Further, the variable diameter pulley that provides differential speed control is an inherently inaccurate mechanical device. The same differential speed setting is not repeatable between consecutive seams. In view of the inaccurate DC drive system and the variable speed transmission for the drive wheels, wheel speed adjustment and calibration are constant problems. These problems are particularly evident when thinly coated fabrics are being welded and where the amount of heat energy delivered to the seam must lie within a narrow range.

In addition, the inaccurate control of the wheel speed results in the two edges of the fabric being joined not "in registration." In other words, at the end of the seam, one piece is shorter or longer than the other. Such an occurrence effects the overall quality of the product being made.

Thus, there is a need for a hot air welding apparatus that provides accurate control of the drive wheel speed and, consequently, accurate control of the amount of heat applied to the seam. There is a further need for a hot air welding apparatus that provides a differential speed setting that is repeatable between consecutive seams and that allows the drive wheel settings to be adjusted while the seam is being welded. In addition, there is a need for a hot air welding apparatus that joins the edges of two pieces of fabric "in registration."

SUMMARY OF THE INVENTION

The present invention provides a hot air welding apparatus that provides accurate and repeatable control of the drive wheel speed. To afford very precise control of the speed and relative rotation of the drive wheels at all times during the welding process, the present invention is provided with a computer control system and two high torque stepper motors, one for each drive wheel. The computer control system allows the speed and position of the drive wheels to be regulated with a very high accuracy. Further, the computer control system allows the stepper motors to be mounted very close to the drive wheels, thereby eliminating the extensive set of chains and pulleys that are inherent in the welders of the prior art and thus further reducing the inaccuracies brought about by the stretched chains and other elements of the drive chain. The computer control system allows the drive wheel settings to be adjusted while the seam is being welded and further includes an automatic ramp capability, a repeat mode, and a test strip mode. Further, the computer control system is capable of controlling the temperature of the air used in the welding process.

BRIEF DESCRIPTION OF THE DRAWINGS

FIG. 5 is a block diagram of the computer control module of the present invention.

DETAILED DESCRIPTION OF THE INVENTION

Figure 1:
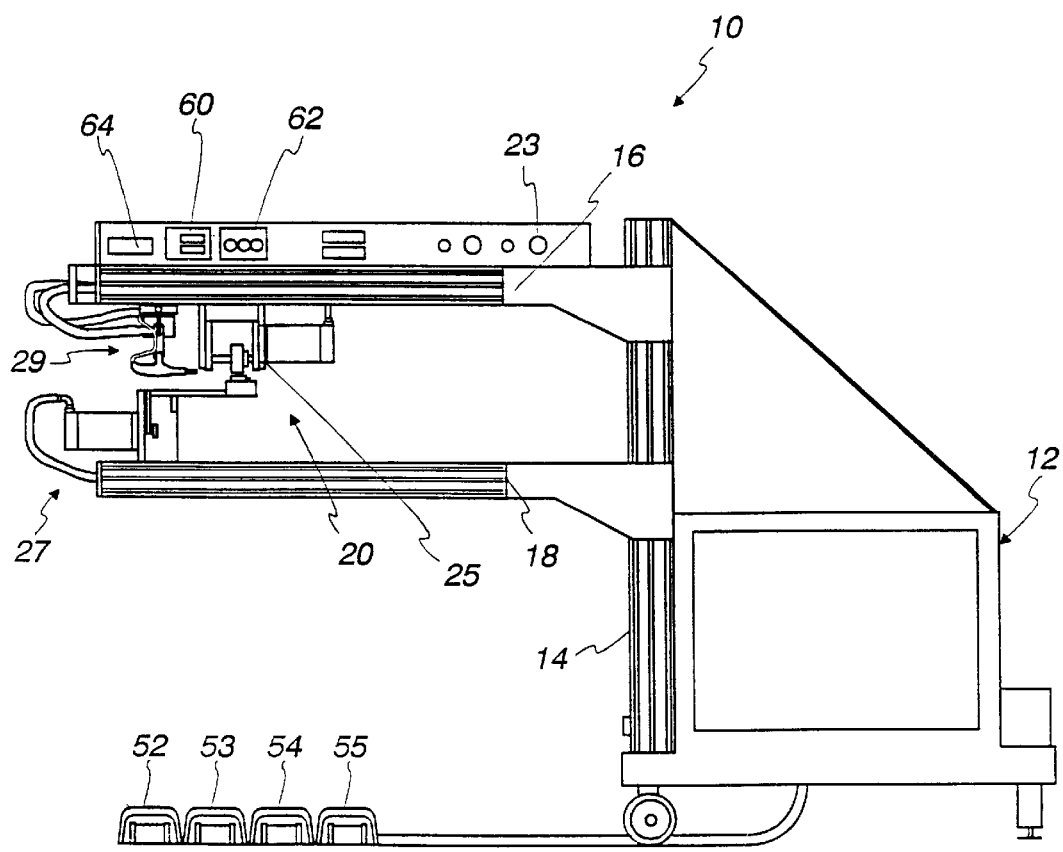
FIG. 1 is a perspective view of the welding apparatus of the present invention.
Figure 2:
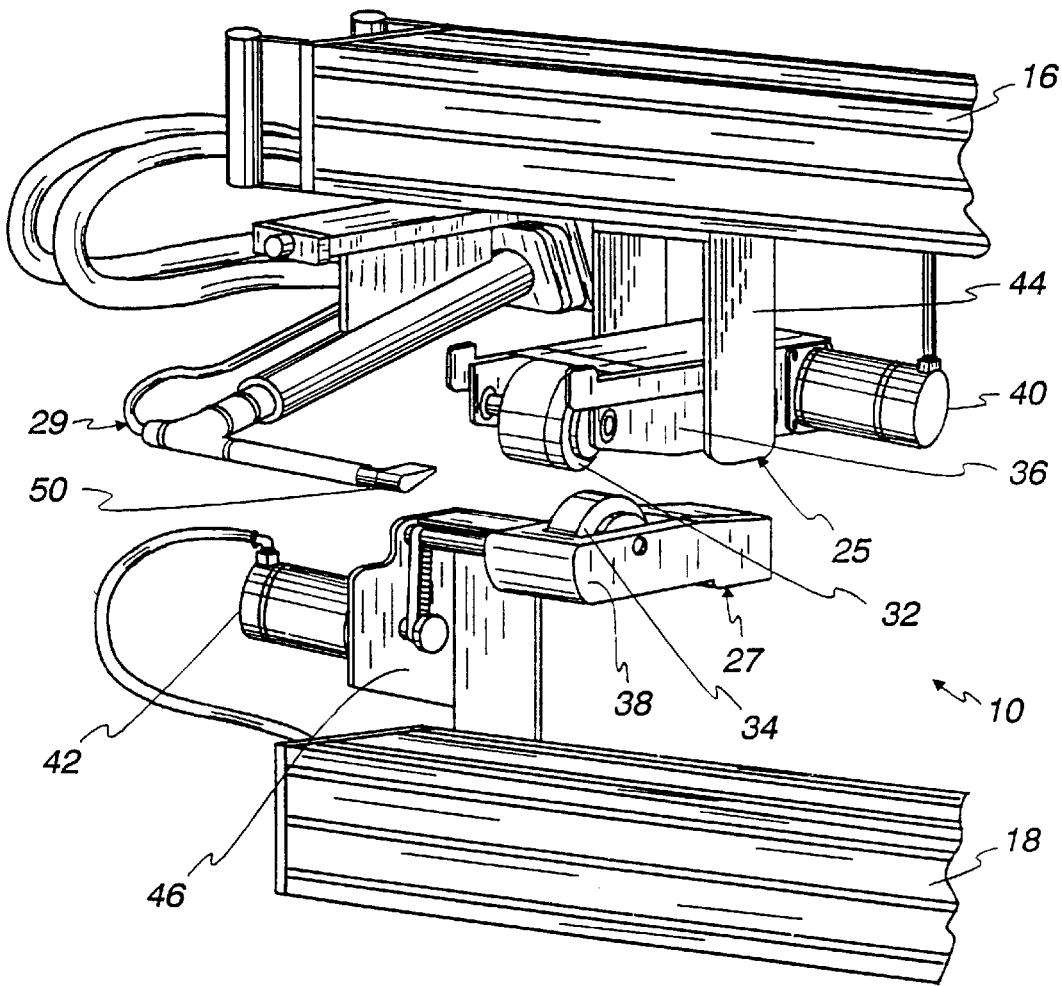
FIG. 2 is a perspective view of the weld head cluster of the present invention.
Figure 3:
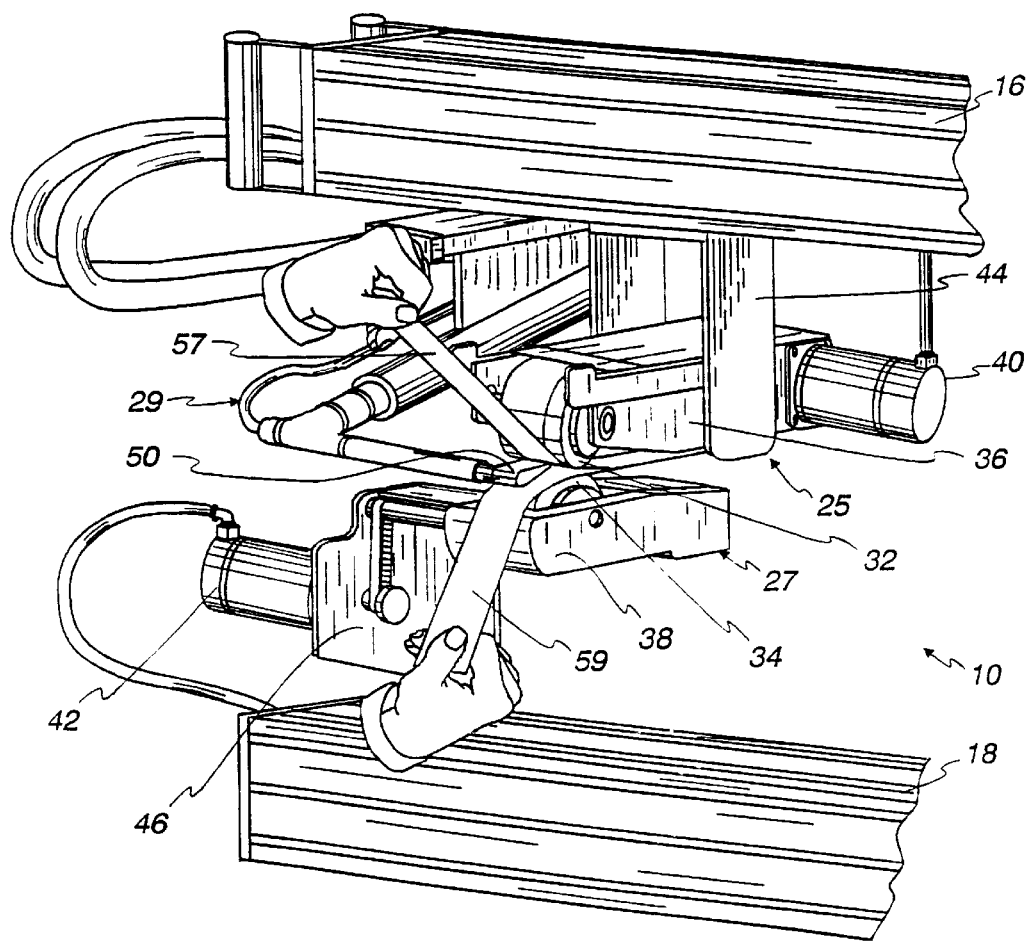
FIG. 3 is a perspective view of the weld head cluster in use.

The rotary hot air welding apparatus 10 of the present invention is shown in FIGS. 1–3. Referring to FIG. 1, the present invention generally includes a cabinet or frame 12, a vertical post member 14, upper and lower beam members 16, 18 extending from the post member 14, and a weld head cluster 20. The upper beam 16 is provided with a computer control module 23 along its upper surface.

The cabinet 12 houses the main power supply for the welding apparatus and the pump for the hot air assembly, discussed below. The cabinet serves as the rigid frame or base that supports all of the other modules of the welding apparatus. It further allows the main power supply to be protected, isolated and distributed throughout the apparatus.

As can be seen generally in FIG. 1 and more specifically in FIG. 2, the weld head cluster 20 includes a upper wheel module 25, a lower wheel module 27 and a hot air assembly 29. In the preferred embodiment, the upper wheel module 25 and the hot air assembly 29 are carried by the upper beam member 16 while the lower wheel module 27 is carried by the lower beam member 18.

Each wheel module includes a drive wheel 32, 34, a housing 36, 38 for housing the drive wheel, a stepper motor 40, 42 operatively coupled to the drive wheel, and a support member 44, 46 for supporting the module from its respective beam member. Each stepper motor 40, 42 powers a respective drive wheel 32, 34 via an industrial timing belt and a conventional gear arrangement using, for example, simple toothed, in-line gears. Mounting the stepper motors adjacent to the drive wheels enables more accurate control of the wheel speed by eliminating the extensive drive chain and pulley arrangements found in conventional devices.

The hot air assembly 29 of the present invention includes a nozzle 50 for directing the hot air to the seam which is operatively connected to the air pump (not shown) housed in the cabinet 12. A conventional hot air assembly is utilized in the present invention. In the preferred embodiment, hot air is used as the heat source to weld the pieces of fabric together. However, the heat source can alternately take the form of a hot wedge, or a propane flame.

Referring to FIG. 1, the computations necessary to control the air temperature and drive wheel speed occur within the computer control module 23. The main power is supplied from the cabinet 12, converted to the correct phase and voltage, and then is supplied to the computer control module 23.

The computer control system 23 sends accurately timed and amplified pulses to the stepper motors. Since a stepper motor rotates a specific increment of a revolution with each amplified pulse, the control system allows the speed and relative rotation of the drive wheels to be regulated with a very high accuracy during the welding process. The control system, through its operator interface which includes a suitable keypad 60, switches 62, and display 64, also allows the operator to more easily establish and set the exact speed and temperature parameters for the welding process. The present invention is further provided with a set of four foot pedal switches 52–55 which are operatively connected to the computer control system.

FIG. 5 illustrates a block diagram of the inputs and outputs of the computer module 23 used by the present invention. The computer module 23 includes a computer control system 75 that has as its inputs keypad 60, switches 62, and foot pedals 52–55. The data from the inputs is used by the computer control system 75 to control the speeds of the upper wheel module 25, the lower wheel module 27, and the hot air assembly 29 according the principles of the present invention.

The outputs of the computer control system 75 are connected to pulse amplifier 77, 79 that are connected the stepper motors 40, 42, respectively, that control the speeds of drive wheels 32, 34, respectively. Each pulse amplifier 77, 79 inputs a suitable signal to the stepper motors 40, 42 to control the speeds of the drive wheels 32, 34 according to the inputs from the keypad 60, switches 62 and foot pedals 52–55.

The computer control system 75 is also outputted to a solid state relay 81 that controls the hot air assembly 29. The hot air assembly 29 includes an air heater electrical power supply 83, an air pump 85, an air heater 87, and air nozzle 50. The output of the computer control system 75 and the air heater electrical power supply 83 are inputted into solid state relay 81 that controls the air heater 87. The air heater 87 heats air received from the air pump 85. The heated air is then output through the air nozzle 50 to heat the fabric pieces being pinched by the drive wheels 32, 34.

FIG. 3 depicts the present invention in use. In operation, the hot air welding apparatus 10 of the present invention uses hot air from the hot air assembly 29 to join together two pieces of plastic coated fabric 57, 59. The welder 10 first injects a stream of hot air from the hot air nozzle 50 between the two pieces of coated fabric 57, 59. The fabric pieces 57, 59 are then pinched between and pulled through the welder by the two drive wheels 32, 34, each drive wheel driven by a respective stepper motor 40, 42. The stepper motors 40, 42 move exactly 1/400 a revolution with each amplified pulse from the computer control system. By tracking the number of pulses sent, the control system monitors the speed and relative rotation of the drive wheels. As will be discussed in detail below, the computer control system allows the operator to control the various aspects of the welding process.

An operator can use two of the foot pedals switches 52–55 to give differential wheel speed commands to the control system while steering the pattern pieces through the welding apparatus. Such corrective commands are useful when welding patterns having both curves and straight sections that are best welded by applying differential wheel speed control at particular places on the seam rather than throughout the seam. In the preferred embodiment, the amount of the differential step is applied to one wheel only, for example, the top wheel, is approximately a 1% increase or decrease. The amount represents the incremental change to the top wheel speed that will cause a small but noticeable difference or correction in the panel registration over the next several inches of seam. For example, if the top pattern piece is getting ahead of the bottom piece, the appropriate pedal press will reduce the speed of the top wheel by approximately 1% with respect to the bottom wheel. The operator can give the speed correction command by closing a foot pedal switch while still keeping both hands on the panels as they are fed or steered into the weld area of the apparatus. Subsequent foot pedal switch commands produce the same (additive) result.

Wheel speed corrections can also be made for both drive wheels together in exact percentage steps (increase or decrease) of the current wheel speed. This feature is useful when the operator notices that either too much or too little heat is being delivered to the seam while the seam is being welded. In a preferred embodiment, the amount of each step is either an approximate 5% increase or decrease. The amount represents the incremental change to the wheel speed that will result in a small but noticeable difference in seam appearance. The speed correction command is given by closing a foot pedal switch, again allowing the operator to keep both hands on the pattern pieces as they are fed or steered into the weld area of the apparatus. Subsequent foot pedal switch commands produce the same (additive) result.

Some closed patterned products such as tubes build up heat inside the product as a long seam is welded. This heat buildup is caused by an accumulation of hot air inside the tube. To address this problem, the control system of the present invention includes a ramp function. With this ramp function, the operator can command the control system to automatically increase the speed of both drive wheels 32, 34 by a set percentage for each repeating increment of seam, prior to performing a weld. This feature of the control system allows the operator to automatically decrease the amount of heat energy delivered to the seam for those types of seams and panel geometry that tend to accumulate heat over a long seam. This will avoid excessive heat buildup in enclosed patterns with long seams and thus prevent any resultant scorching or burning of the fabric. In the preferred embodiment, the speed increase is adjustable from approximately 0–5% and is imposed on the current wheel speed about every 20 inches of seam.

The computer control system is further provided with a repeat mode which allows the operator to command the apparatus to repeat a set of foot pedal wheel speed corrections that were imposed on the previous seam. In the preferred embodiment, the control system automatically records, for each foot pedal correction event, the type of event and the location it occurred on the seam to an accuracy of approximately 0.1 inch. By placing the control system in repeat mode before welding the next seam, the control system will automatically impose the same foot pedal corrections at the same locations. Thus, the operator can concentrate on steering the panels into the welding apparatus. The use of the repeat mode assumes that the previous series of foot pedal corrections produced the desired weld and that for the subsequent flow of the panels through the machine, the stresses on the panels, and the foot pedal corrections as they were just welded are similar enough for the exact weld to be duplicated. This is the function of the repeat mode. There is a need for such a repeat function when welding panels with rotary heat sealing equipment.

The computer control system is also provided with a test strip mode. Prior to performing a production weld, it is necessary to find the ideal speed and temperature settings for that particular situation. The settings are sensitive to many variables including the type of fabric coating, the welding pressure, the thickness of the fabric, the length of the seam, the operator's proficiency, and external factors such as the relative humidity. An operator can use the test strip mode of the present invention to weld a test strip using scrap fabric of the same type. In this mode, the wheel speed is started at a higher speed than the nominal speed setting and is reduced periodically as the seam is welded. Thus, a welded test strip is produced that can be pulled apart to find where the heat energy was too low to weld and where the heat energy was so high that the panels were distorted or burnt. The optimum speed would lie about half way between those two locations on the test strip. In the preferred embodiment, there are two test strip modes, fine and coarse. For the coarse mode, the starting speed is approximately 50% faster that the nominal setting and the speed decreases by approximately 5% of the nominal setting for every inch of weld. For the fine mode, the starting speed is approximately 10% faster than the nominal speed and decreases by approximately 1% for every inch of weld. The test strip mode of the present invention allows the operator to find the ideal weld speed and thereby assure the highest quality of weld for that set of conditions.

Hot air welders of the prior art deliver a constant temperature air flow to the fabric seam being welded. The speed of the fabric flowing through the machine is controlled to limit the exposure of the fabric to the air stream and thereby maintain an adequate welding process. This constant speed, constant temperature arrangement requires that a complete seam must be welded at the same nominal speed. Thus, if the pattern includes a curved portion and a straight portion, the presence of the curved portion would require that the entire seam be welded at a slower speed. Understandably, this has limited production. The control system of the present invention, however, enables the temperature of the air stream to be changed during welding. The control system can then adjust the wheel speed to keep the welding process at an ideal speed/temperature combination, regardless of the temperature the air stream produces. With this feature, the hot air welder of the present invention can operate much more like a sewing machine in that the operator has some ability to speed up for the long straight sections and to slow down to accommodate any curves in the pattern.

Figure 4:
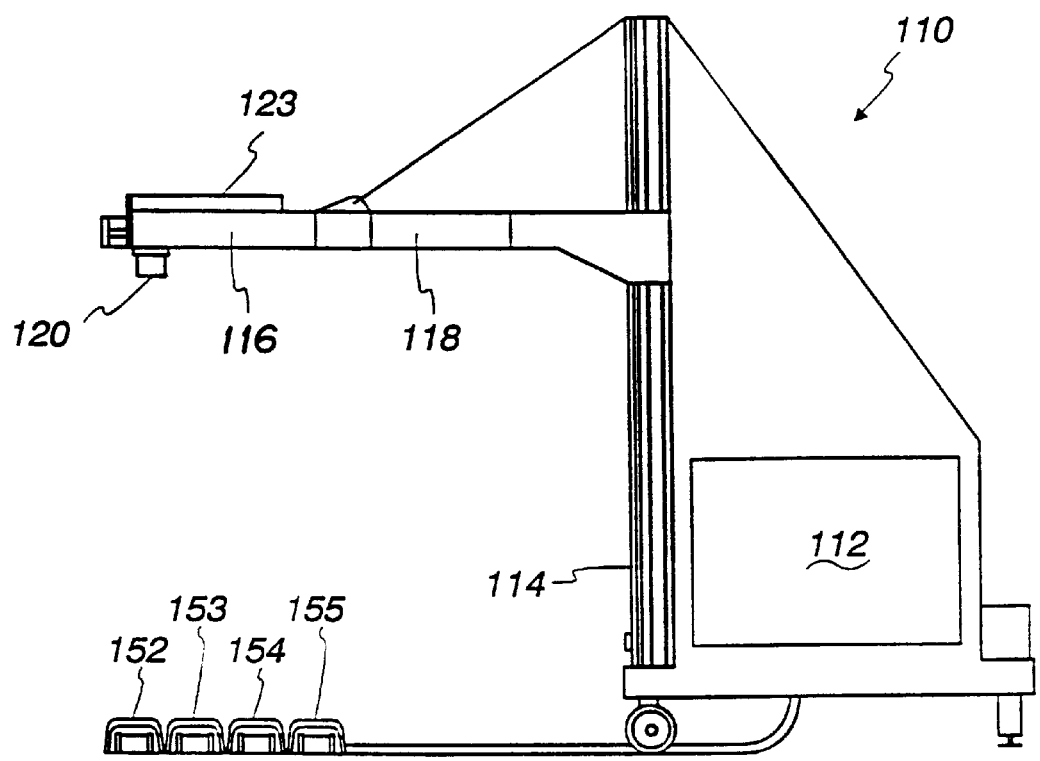
FIG. 4 is a side view of an alternate equivalent embodiment of the present invention.

Of course, the present invention is not limited to the embodiment shown in FIG. 1. An alternate equivalent embodiment of the apparatus shown in FIG. 4 includes an extension 118 between the beam 116 and the post member 114. The height of the post 114 has also been increased in order to provide additional support to the beam 116 and the extension 118. The remaining structure of the rotary hot air welding apparatus 110 shown in FIG. 4 generally corresponds to the structure shown in FIG. 1 and also generally includes a cabinet or frame 112, a weld head cluster 120, a computer control module 123, and foot pedals 152–155. These alternate arrangements allow a wider variety of finished products to be made.

Since the welding apparatus of the present invention is easier to use than welding apparatus of the past, this reduces the stress on the operator by reducing the number of variables that the operator must monitor while welding a seam. Operators, in turn, produce higher quality seams with lower waste from process errors. The present invention also enables fabrics having a very thin coating to be welded successfully. In the past, these fabrics have been difficult or impossible to weld.

It should be understood that various changes and modifications to the preferred embodiments described herein will be apparent to those skilled in the art. For example, the use of stepper motors to achieve the high accuracy and repeatability of the system could alternately be achieved by using a traditional DC servomotor system with an encoder feedback to the computer control system. Such changes and modifications can be made without departing from the spirit and scope of the instant invention and without diminishing its attendant advantages. It is therefore intended that such changes and modifications be covered by the appended claims.

I claim:

1. A rotary hot air welding apparatus for welding two panels of industrial textiles together to form a seam comprising:

a weld head cluster having an upper drive wheel module, a lower drive wheel module, and a hot air assembly, wherein the upper drive wheel module is positioned above the lower drive wheel module to form a pinch area therebetween into which the two panels are fed in movement driven by the drive wheels, and the hot air assembly is positioned in front of the pinch area to apply heat from hot air to the two panels to form a seam thereof;

each drive wheel module including a drive wheel and a motor for providing power to drive the respective drive wheel;

a control means for controlling the welding of the seam having an operator input means for controllably adjusting and changing differential wheel speeds of the drive wheels relative to each other during a seam operation by causing the control means to output an upper drive wheel control signal and a lower drive wheel control signal for controlling the respective drive wheels independently of each other, such that the control means is capable of making differential wheel speed corrections to the respective drive wheels while the seam is being welded in order to control the movement of the panels into the bite area and, thereby, the amount of heat being delivered to the seam; and said operator input means including switch means for providing commands regarding wheel speed corrections to be made from an operator to the control means.

2. The rotary hot air welding apparatus of claim 1 wherein each motor rotates a respective drive wheel a specific increment of a revolution with each amplified pulse from the control means.

3. The rotary hot air welding apparatus of claim 1 wherein the wheel speed correction comprises an increase in the speed of both drive wheels by a set percentage for each repeating increment of seam.

4. The rotary hot air welding apparatus of claim 1 wherein the wheel speed correction comprises a decrease in the speed of both drive wheels by a set percentage for each repeating increment of seam.

5. The rotary hot air welding apparatus of claim 1 wherein the control means is capable of making wheel speed corrections to only one drive wheel by a set percentage while the seam is being welded for situations where one panel of material is pulling ahead or dropping behind another panel.

6. The rotary hot air welding apparatus of claim 1 wherein the wheel speed correction comprises an increase in the speed of both drive wheels by a set percentage for each repeating increment of seam in order to decrease the amount of heat energy delivered to the seam.

7. The rotary hot air welding apparatus of claim 1 wherein the control means includes a ramp function.

8. The rotary hot air welding apparatus of claim 1 wherein the control means includes a repeat mode.

9. The rotary hot air welding apparatus of claim 8 wherein the control means records each wheel speed correction, the type of correction and the location of the correction of a previous seam.

10. The rotary hot air welding apparatus of claim 9 wherein, in response to a command issued by the operator, the control means performs the recorded wheel speed corrections at the same locations as occurred during the previous seam.

11. The rotary hot air welding apparatus of claim 1 wherein the control means includes at least one test strip mode.

12. The rotary hot air welding apparatus of claim 11 wherein the wheel speed is started at a higher speed than the nominal speed setting and is reduced periodically as the seam is welded.

13. The rotary hot air welding apparatus of claim 12 wherein the starting wheel speed is 50% faster than the nominal speed setting and the speed decreases by 5% of the nominal setting of every inch of weld.

14. The rotary hot air welding apparatus of claim 12 wherein the starting wheel speed is 10% faster than the nominal speed setting and the speed decreases by 1% of the nominal setting of every inch of weld.

15. The rotary hot air welding apparatus of claim 1 further including a temperature control function.

16. The rotary hot air welding apparatus of claim 15 wherein the control means is capable of controlling the temperature of the air delivered from the hot air assembly to the seam.

17. A rotary hot air welding apparatus for welding two panels of industrial textiles together to form a seam comprising:

a weld head cluster having an upper drive wheel module, a lower drive wheel module, and a hot air assembly;

each drive wheel module including a drive wheel and a motor for providing power to drive the respective drive wheel, wherein the upper drive wheel module in positioned above the lower drive wheel module to form a pinch area therebetween into which the two panels are fed in movement driven by the drive wheels, and the hot air assembly is positioned in front of the pinch area to apply heat from hot air to the two panels to form a seam thereof;

a control means for independently controlling the temperature of the hot air from the hot air assembly and the speeds of the drive wheels, the control means having an operator input means for controllably adjusting and changing differential wheel speeds of the drive wheels relative to each other during a seam operation by causing said control means to output an upper drive wheel control signal and a lower drive wheel control signal for controlling the respective drive wheels independently of each other, such that the control means is capable of making differential wheel speed corrections to the respective drive wheels while the seam is being welded in order to control the movement of the panels into the bite area and, thereby, the amount of heat being delivered to the seam; and said operator input means including switch means for communicating correction commands from an operator to the control means.

18. A rotary hot air welding apparatus for welding two panels of industrial textiles together to form a seam comprising:

a weld head cluster having an upper drive wheel module, a lower drive wheel module, and a hot air assembly;

each drive wheel module including a drive wheel and a motor for providing power to drive the respective drive wheel, each motor being located adjacent to the respective drive wheel, and wherein the upper drive wheel module is positioned above the lower drive wheel module to form a pinch area therebetween into which the two panels are fed in movement driven by the drive wheels, and the hot air assembly is positioned in front of the pinch area to apply heat from hot air to the two panels to form a seam thereof;

a control means for controlling the respective drive wheels of the drive wheel modules independently of each other having an operator input means for controllably adjusting and changing differential wheel speeds of the drive wheels relative to each other during a seam operation; and said operator input means including switch means for providing wheel speed commands regarding corrections to be made to the driving of the respective drive wheels from an operator to the control means.

19. The rotary hot air welding apparatus of claim 18 wherein each drive wheel module further includes a timing belt and a gear arrangement for providing power from the motor to the drive wheel.

* * * * *